United States Patent
Hayashi et al.

(10) Patent No.: US 11,562,126 B2
(45) Date of Patent: Jan. 24, 2023

(54) COACHING SYSTEM AND COACHING METHOD

(71) Applicant: Hitachi, Ltd., Tokyo (JP)

(72) Inventors: Hideki Hayashi, Tokyo (JP); Akira Ioku, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/849,025

(22) Filed: Apr. 15, 2020

(65) Prior Publication Data

US 2021/0081600 A1 Mar. 18, 2021

(30) Foreign Application Priority Data

Sep. 12, 2019 (JP) .............................. JP2019-166471

(51) Int. Cl.
| | | |
|---|---|---|
| *G06F 16/93* | (2019.01) | |
| *G06F 40/169* | (2020.01) | |
| *G06F 16/9032* | (2019.01) | |
| *G06F 40/30* | (2020.01) | |

(52) U.S. Cl.
CPC ...... *G06F 40/169* (2020.01); *G06F 16/90332* (2019.01); *G06F 16/93* (2019.01); *G06F 40/30* (2020.01)

(58) Field of Classification Search
CPC .. G06F 40/30; G06F 16/3347; G06F 16/2228; G06F 16/33; G06F 16/3329; G06F 16/36; G06F 16/90332; G06F 40/174; G06F 40/295; G06F 40/169; G06F 16/93
See application file for complete search history.

(56) References Cited

U.S. PATENT DOCUMENTS

| | | | | |
|---|---|---|---|---|
| 6,629,096 | B1* | 9/2003 | Reddy | G06N 5/022 707/603 |
| 8,380,531 | B2* | 2/2013 | Paty | G06Q 30/0203 705/2 |
| 2002/0065845 | A1* | 5/2002 | Naito | G06F 16/3347 715/248 |
| 2003/0149704 | A1* | 8/2003 | Yayoi | G06F 16/3326 |
| 2005/0021314 | A1* | 1/2005 | Rose | G06F 30/00 703/1 |
| 2005/0164154 | A1* | 7/2005 | Solomon | G09B 7/00 434/350 |
| 2006/0230008 | A1* | 10/2006 | Burgener | G06N 3/02 706/25 |
| 2006/0242180 | A1* | 10/2006 | Graf | G06F 16/86 |
| 2016/0224893 | A1* | 8/2016 | Parker, Jr. | G06N 5/02 |
| 2019/0156198 | A1* | 5/2019 | Mars | G06N 3/084 |
| 2019/0347319 | A1* | 11/2019 | Goyal | G10L 15/32 |
| 2020/0007380 | A1* | 1/2020 | Chen | H04L 41/046 |
| 2020/0097616 | A1* | 3/2020 | Asur | G06F 16/3329 |
| 2020/0184956 | A1* | 6/2020 | Agarwal | G10L 15/07 |

FOREIGN PATENT DOCUMENTS

JP 2019-28604 A 2/2019

* cited by examiner

*Primary Examiner* — Wilson W Tsui
(74) *Attorney, Agent, or Firm* — Mattingly & Malur, PC

(57) ABSTRACT

In coaching with the purpose of creating a document in mind, data containing question group related to components of the document, a question of details, and a question of another topic is included, an increase/decrease of information amount of the answers of the writer is estimated from a writer's past answers and a current answer, and a next question is selected based on the estimation result.

6 Claims, 6 Drawing Sheets

FIG. 2

| DOCUMENT TYPE ID | DOCUMENT TYPE NAME |
|---|---|
| 1 | ACADEMIC PAPERS |
| 2 | PATENTS |
| 3 | EXPERIMENTAL NOTES |
| ... | ... |

FIG. 3

| DOCUMENT TYPE ID | DOCUMENT CONFIGURATION ID | DOCUMENT CONFIGURATION NAME |
|---|---|---|
| 1 | 1 | ABSTRACT |
| 1 | 2 | BACKGROUND |
| 1 | 3 | RELATED STUDIES |
| 1 | 4 | STUDY METHOD |
| 1 | 5 | EXPERIMENTS |
| 1 | 6 | RESULTS AND CONSIDERATIONS |
| 1 | 7 | CONCLUSION |
| ... | ... | ... |

FIG. 4

| DOCUMENT TYPE ID | DOCUMENT CONFIGURATION ID | QUESTION ID | QUESTION CONTENT |
|---|---|---|---|
| 1 | 1 | 1 | |
| ... | ... | ... | ... |
| 1 | 2 | 1 | WHAT IS STUDY MOTIVATION? |
| 1 | 2 | 2 | WHAT IS CONVENTIONAL STUDY? |
| 1 | 2 | 3 | WHICH KINDS OF CONVENTIONAL STUDY IS? |
| 1 | 2 | 4 | WHAT IS PROBLEM IN CONVENTIONAL STUDY? |
| 1 | 2 | 5 | WHAT IS STUDY PURPOSE? |
| 1 | 2 | 6 | |
| ... | ... | ... | ... |

COACHING SYSTEM AND COACHING METHOD

CROSS-REFERENCE TO RELATED APPLICATION

The present application claims priority from Japanese application JP2019-166471, filed on Sep. 12, 2019, the contents of which is hereby incorporated by reference into this application.

BACKGROUND OF THE INVENTION

1. Field of the Invention

The present invention relates to a coaching system and a coaching method for supporting atypical intellectual work.

2. Description of the Related Art

With the development of information and communication technology in recent years, business efficiency of companies and universities has been improved. Standardized tasks have been streamlined by automated calculations by mainframes and servers. Also, the spread of the Internet and mobile devices has facilitated information sharing within organizations.

Recently, artificial intelligence technology has been remarkably developed, and artificial intelligence technology has been applied to work, thereby further improving work efficiency. For example, in an accounting process or an audit in a company, where a person checks a page of an accounting document, the checking is automated by a character recognition technology.

In the future, it is expected that artificial intelligence technology will be applied to atypical intellectual work to contribute to value creation. There are various tasks in atypical intellectual tasks. However, the following description is directed to creation of a document that requires specialized knowledge and requires high quality. For example, research papers written by researchers, patents and contracts written by technicians, etc. are targeted.

In such a task, in the process of creating a document, a person is conscious of guidelines for creating a document, answers that person's own questions, and creates a document while organizing ideas.

On the other hand, in order to improve the quality of a document, it is common to have a person (expert) with advanced expertise check the document, and then formulate the document by answering questions from the expert. However, in this method, depending on the schedule of the expert, the document cannot be sufficiently refined, or it takes time to sufficiently refine the document.

JP 2019-28604 A discloses a technique for automatically estimating the characteristics of a user in an interactive system and presenting details of a response in accordance with the estimation result, thereby improving the accuracy of estimating the knowledge of the user of the interactive partner.

SUMMARY OF THE INVENTION

The technology described in JP 2019-28604 A discloses a technology for automatically estimating the characteristics of a user and presenting the content of a response in accordance with the estimation result, and thus improving the accuracy of estimating the knowledge of the user as a conversation partner. However, there is no mention of selecting an appropriate question for estimating the user's knowledge.

It is considered that a system for asking questions, like an expert, can refine documents without relying on the expert's schedule. The expert not only asks the points necessary for preparing the document, but also deepens the question or asks a question on another topic according to the answer from humans. In other words, in systematizing, it is important to ask humans appropriate questions according to human answers.

Therefore, an object of the invention is to provide a coaching system and a coaching method for supporting an atypical intellectual task by asking a human an appropriate question.

A representative example of the invention disclosed in the application is as follows. A coaching system for supporting creation of a document includes a question presenting unit that selects a question for a user, an answer receiving unit that receives an answer to a question selected by the question presenting unit, a data management unit that stores an answer received by the answer receiving unit, and an information amount estimating unit that calculates a similarity between a past answer of the user stored in the data management unit and a current answer. The question presenting unit selects a topic change question if the similarity received from the information amount estimating unit is greater than a predetermined value, and selects a detail question if the similarity is small.

According to this invention, atypical intellectual work is supported, for example, it is possible to streamline the creation of documents such as academic papers and patents, and to improve the quality of created documents.

BRIEF DESCRIPTION OF THE DRAWINGS

FIG. 2 is an explanatory diagram of document type data according to the first embodiment;

FIG. 3 is an explanatory diagram of document configuration data according to the first embodiment;

FIG. 4 is an explanatory diagram of question data of the first embodiment;

DESCRIPTION OF THE PREFERRED EMBODIMENTS

Figure 1:
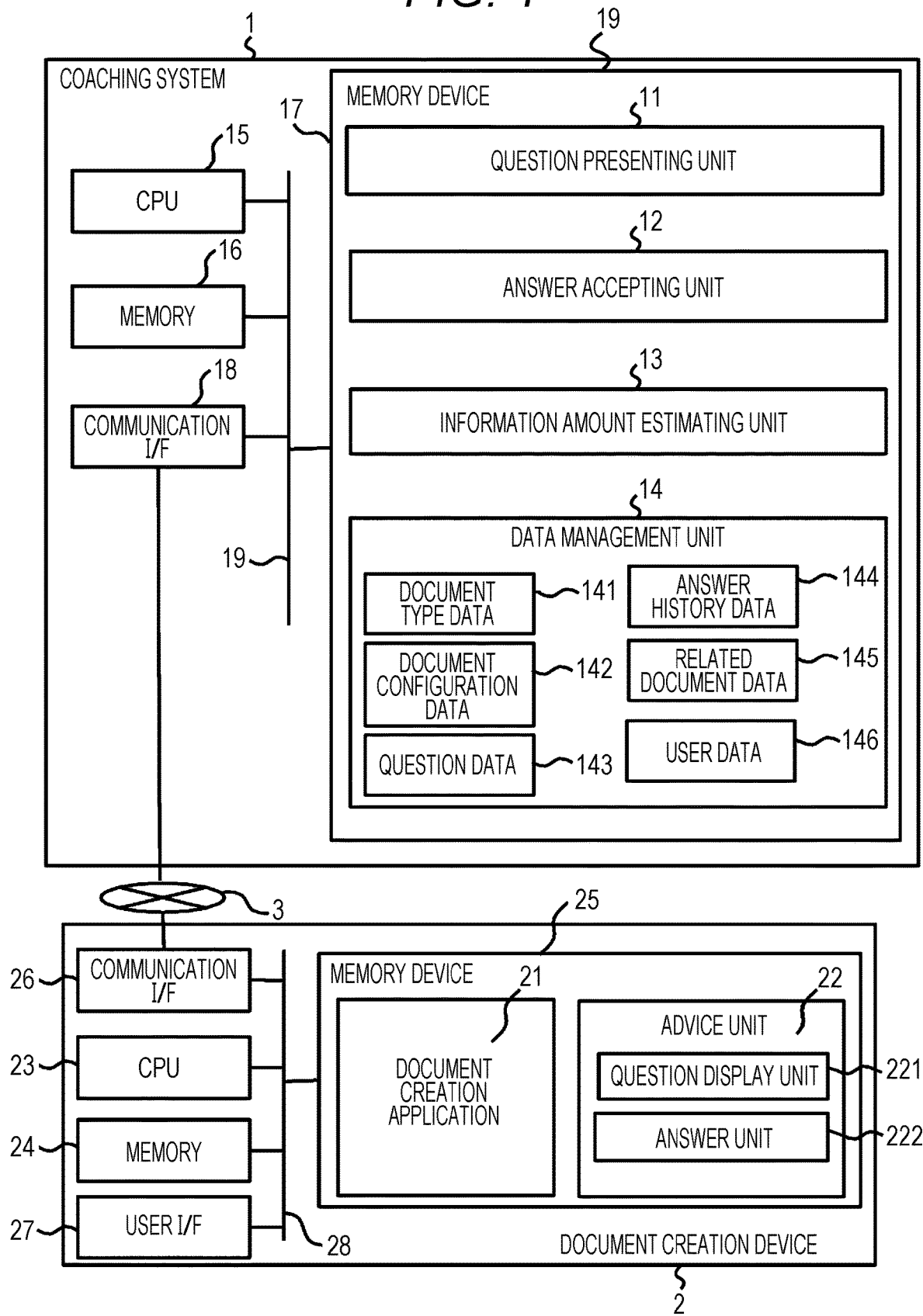
FIG. 1 is a schematic diagram of a coaching system according to a first embodiment.

Hereinafter, embodiments of the invention will be described with reference to the drawings. The embodiment relates to a coaching system for assisting a user in creating a document for explaining the invention. Omissions and simplifications have been made where appropriate for clarity of explanation. The invention can be implemented in other various forms. Unless otherwise limited, each component may be singular or plural.

Examples of various types of information may be described using expressions such as "table", "list", and "queue". However, various types of information may be expressed in other data structures. For example, various types of information such as "XX table", "XX list", and "XX queue" may be "XX information". In describing the identification information, expressions such as "identification information", "identifier", "name", "ID", and "number" are used, but these can be replaced with each other.

When there are a plurality of components having the same or similar functions, different subscripts may be given for the same reference numerals for explanation. In addition, when there is no need to distinguish between these components, the description may be omitted with subscripts omitted.

In the embodiment, a process performed by executing a program may be described. Here, a computer executes a program by a processor (for example, CPU or GPU), and performs a process defined by the program using a storage resource (for example, memory), an interface device (for example, communication port) and the like. For this reason, a processor may be the subject of the processing performed by executing the program. Similarly, the subject of the processing performed by executing the program may be a controller having a processor, an apparatus, a system, a computer, or a node. The subject of the process performed by executing the program may be an arithmetic unit, and may include a dedicated circuit for performing a specific process. Here, the dedicated circuit is, for example, a field programmable gate array (FPGA), an application specific integrated circuit (ASIC), a complex programmable logic device (CPLD), or the like.

The program may be installed on a computer from a program source. The program source may be, for example, a program distribution server or a computer-readable storage medium. In a case where the program source is a program distribution server, the program distribution server includes a processor and a storage resource for storing the program to be distributed, and the processor of the program distribution server may distribute the program to be distributed to another computer. In addition, in the embodiments, two or more programs may be expressed as one program, or one program may be expressed as two or more programs.

First Embodiment

FIG. 1 is a schematic diagram of a coaching system 1. The coaching system 1 according to the first embodiment selects predetermined question data for supporting creation of a document from a plurality of question data. The coaching system 1 operates so that a question presenting unit 11 presents predetermined question data to the user. The user proceeds with document creation by answering predetermined questions. Further, the question data includes a viewpoint necessary for writing a document.

The coaching system 1 has a CPU 15, a memory 16, a communication I/F 18, and a memory device 19, which form a processing unit, like a general information processing system. The memory 16 includes a DRAM and an SRAM, and stores programs and data to be executed by the CPU 15. The communication I/F 18 is an interface for connecting via a network 3 to a document creation device 2 which is an external device. The memory device 19 is configured by a memory drive such as an HDD or an SSD, and stores various programs and management data.

The question presenting unit 11, an answer receiving unit 12, and an information amount estimating unit 13 illustrated in the memory device 19 in FIG. 1 are functions realized by the CPU 15 performing respectively a question presenting program, an answer receiving program, and an information amount estimating program stored in the memory device 19. In the embodiment, in order to help with understanding, each function is described as a function block diagram as the question presenting unit 11, the answer receiving unit 12, and the information amount estimating unit 13.

Further, a data management unit 14 stores various types of data such as document type data 141, document configuration data 142, question data 143, answer history data 144, related document data 145, and user data 146 described below.

The question presenting unit 11 searches for a question for the user, and transmits the searched question to the document creation device 2.

The answer receiving unit 12 receives an answer from the user to the question, and stores the received answer in the data management unit 14.

The question presenting unit 11 selects a type of a question to be presented to the user. The question presenting unit 11 estimates a change in the information amount from the user in consideration of the user's past answer history, and selects the type of the next question (detail question, topic change question) based on the estimation result. For example, if the information amount from the user is increasing, further information is extracted by asking a question of details (detail question). On the other hand, if the information amount has not increased so much, a question on a different topic (topic change question) is selected, and information on a different topic is extracted from the user. Further, the question presenting unit 11 searches the question data 143 for a specific question according to the type of the selected question. In order to avoid presenting the same question to the user, the user refers to the answer history data 144 and searches for a question that has not been presented so far.

In addition, the question presenting unit 11 transmits the predetermined question data retrieved by the question presenting unit 11 to the document creation device 2.

Before describing the answer receiving unit 12, the information amount estimating unit 13, and the data management unit 14, a description of the document creation device 2 will be given. The document creation device 2 is a device that creates a document by a user's operation.

The document creation device 2 has a CPU 23, a memory 24, a communication I/F 26, a user I/F 27, and a memory device 25, which constitute a processing unit, like a general information processing system.

The memory 24 includes a DRAM and an SRAM, and holds programs and data executed by the CPU 23. The communication I/F 26 is an interface for connecting to the coaching system 1 as an external device via the network 3. The user interface 27 includes, for example, a display device and a speaker, and displays various types of information to a user.

The memory device 25 is configured by a memory drive such as an HDD or an SSD, and stores various programs and management data. A document creation application 21 and an advice unit 22 illustrated in the memory device 25 of FIG. 1 are functions realized by the CPU 15 executing the document creation application program and the advice program stored in the memory device 25, respectively. In the first embodiment, each function is described as a functional block diagram in the document creation application 21 and the advice unit 22 in order to help with understanding.

The document creation application 21 is software used when a user creates a document.

The advice unit 22 is an information input/output unit. The advice unit 22 has a question display unit 221 and an answer unit 222.

The question display unit 221 has a function of outputting predetermined question data transmitted from the question presenting unit 11 to the user interface 27 (illustrated as a user Interface (I/F) in the drawing).

The answering unit 222 is formed of, for example, a keyboard and a microphone, and has a function of acquiring an answer (input document) from the user to predetermined question data.

The advice unit 22 and the document creation application 21 mutually exchange information. Further, the advice unit 22 may acquire information input to the document creation application 21 as input information.

The answer receiving unit 12 of the coaching system 1 has a function of accumulating in the data management unit 14 the answers from the user input from the advice unit 22 of the document creation device 2.

The information amount estimating unit 13 has a function of estimating an increase or a decrease in the information amount from the user in consideration of the past answer history of the user. A specific estimation method will be described later.

The data management unit 14 is a database that stores various types of data. The data management unit 14 will be described in detail with reference to FIGS. 2 to 7. Although the data illustrated in FIGS. 2 to 7 exemplifies data for creating an academic paper, the invention is not limited to this, and can be applied to documents such as patents and contracts. Data may be replaced with data on patents and contracts from data on academic papers as appropriate.

FIG. 2 is an explanatory diagram of the document type data 141 of the data management unit 14. The document type data 141 is data that defines the type of the document. The document type data 141 manages "document type ID" 1411 and "document type name" 1412 in correspondence with each other.

The "document type ID" 1411 stores identification information for each document type. In the "document type ID", for example, "1" is stored.

The "document type name" 1412 stores the name of the document type. The "document type" 1411 stores, for example, "academic papers", "patents", "experimental notes", "contract names", and the like.

FIG. 3 is an explanatory diagram of the document configuration data 142. The document configuration data 142 manages a "document type ID" 1421, a "document configuration ID" 1422, and a "document configuration name" 1423 in association with each other.

The "document type ID" 1421 stores identification information for each document type, and stores the same information as the "document type ID" 1411 defined in the document type data 141.

The "document configuration ID" 1422 stores identification information for each document configuration. The "document configuration ID" stores, for example, "1".

The "document configuration name" 1423 stores information for specifying the components of the document. In the "document configuration name" 1423, if the document type is an academic paper, for example, "summary", "background", and the like are stored. Usually, a plurality of "document configuration IDs" 1422 forming the document are managed in correspondence with one "document type ID" 1421.

In the case of a patent, "the landmark of the invention" or "technical field" may be stored in the "document configuration name" 1423, and in the case of a contract, the "definition" or "period" may be stored.

FIG. 4 is an explanatory diagram of the question data 143. The question data 143 manages the "document type ID" 1431, the "document configuration ID" 1432, the "question ID" 1433, and the "question content" 1434 in correspondence with each other.

The "document type ID" 1431 stores identification information for each document type, and stores the same information as the "document type ID" 1411 defined in the document type data 141.

The "document configuration ID" 1432 stores identification information for each document configuration. The same information as the document configuration ID 1422 defined in the document configuration data 142 is stored.

The "question ID" 1433 stores identification information for each question. In FIG. 4, the smallest "question ID" in the question group in which the "document type ID" 1431 and the "document configuration ID" 1432 are the same is the first question related to the document configuration, and the subsequent "question ID" is a "detail question" that asks a question to extract more information about the same topic. On the other hand, questions having the same "document type ID" 1431 but different "document configuration ID" 1432 are questions of a different topic. Also, if the "document type ID" is different, it is a question of another topic. In this specification, a question for extracting more information about the same topic is called a "detail question", and a question of another topic is called a "topic change question".

As described above, when the "document type ID" and the "document configuration ID" are the same, and the number of the "question ID" is increased, a different question (detail question) is asked about the type of the same document and the configuration of the same document, so that new information is extracted from the user.

On the other hand, if the information amount of the user does not increase for the same topic, the "document configuration ID" is changed to the "document type ID" or the "document type ID" is changed to the previous question, and a question "topic change question" is given to the user to change the topic of the question, so that new information is efficiently extracted from the user.

Therefore, a plurality of "document configuration IDs" 1432 are managed in correspondence with one "document type ID" 1431, and a plurality of "question IDs" 1433 are managed in correspondence with one "document configuration ID" 1432.

With such a configuration of the question data, it is possible to easily search for the next question in the case of a detail question. Also, in the case of the topic change question, it is possible to easily select whether to change the document type, the document configuration, or both.

The "question content" 1434 stores a character string indicating the content of the question. As the question content, a content created by a person in advance or a mechanically extracted history of a past question history regarding document creation is used.

Figure 5:
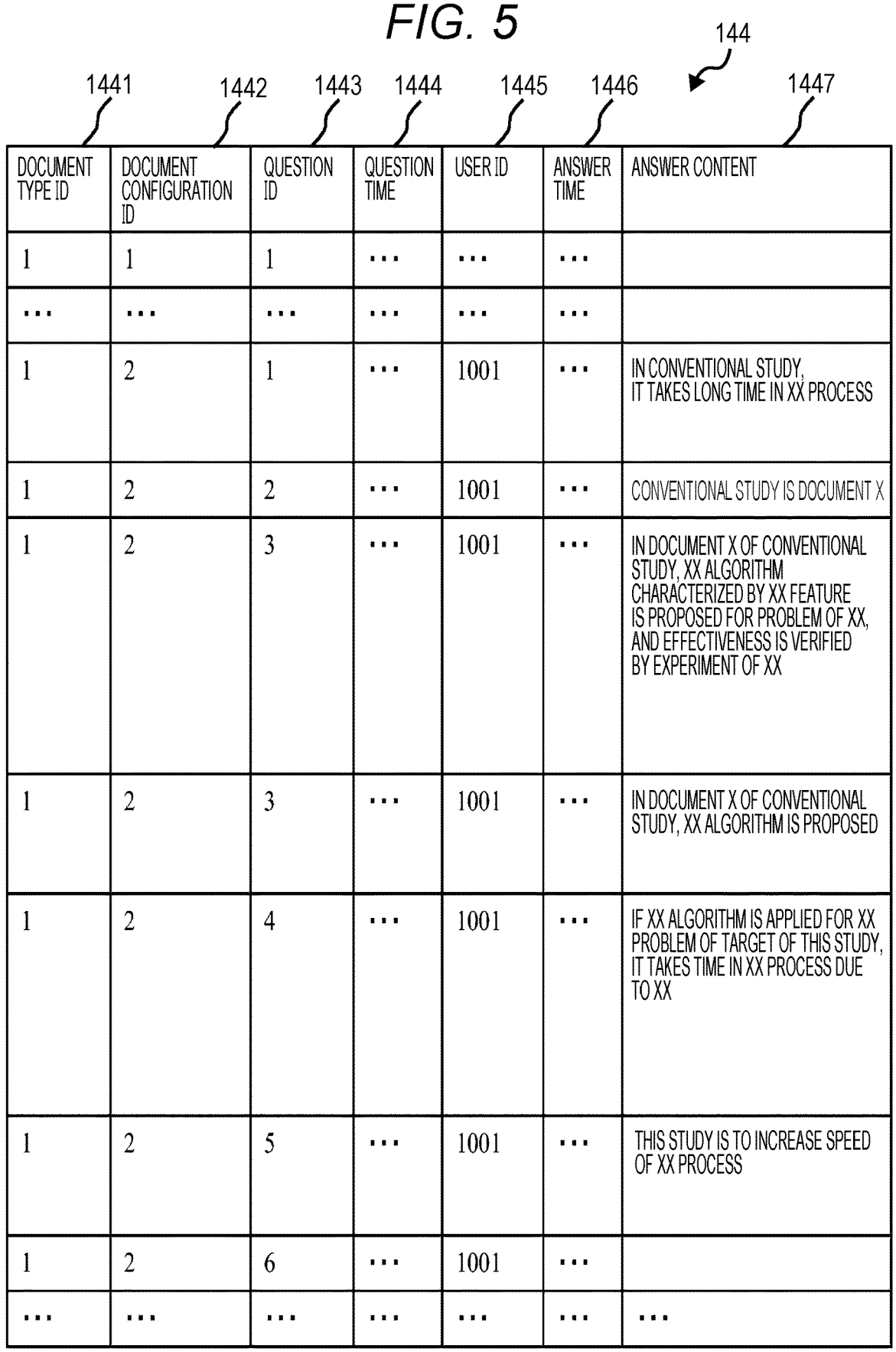
FIG. 5 is an explanatory diagram of answer history data according to the first embodiment.

FIG. 5 is an explanatory diagram of the answer history data 144. In the answer history data 144, the "document type ID" 1441, the "document configuration ID" 1442, the "question ID" 1443, the "question time" 1444, the "user ID" 1445, the "answer time" 1446, and the "answer content" 1447 are managed in correspondence with each other.

The "document type ID" 1441 stores identification information for each document type, and stores the same information as the "document type ID" 1411 defined in the document type data 141.

The "document configuration ID" 1442 stores identification information for each document configuration. The same information as the "document configuration ID" 1422 defined in the document configuration data 142 is stored.

The "question ID" 1443 stores identification information for each question. The same information as the "question ID" 1433 defined in the question data 143 is stored.

In the "question time" 1444, the time at which the question is presented to the user is stored. For example, it is stored in units of year, month, day, hour, minute, and second.

The "user ID" 1445 stores an ID that uniquely identifies a user to whom a question has been presented. The same information as "user ID" 1461 stored in user data 146 described later is stored.

The "answer time" 1446 stores the time at which the user responds. For example, it is stored in units of year, month, day, hour, minute, and second.

In the "answer content" 1447, the content answered by the user is stored as a character string. For example, the "document type ID" 1441 is "1", the "document configuration ID" 1442 is "2", the "question ID" 1443 is "1", and the "question content" 1434 is "What is the study motivation?" "It takes a long time for XX processing in conventional study" is stored as an answer to the question.

For the user ID "1001", the "document type ID" 1441 of "1", the "document configuration ID" 1442 of "2", and the "question ID" 1443 of "3" are asked twice. The answer content 1447 answers "In the document X of the conventional study, the XX algorithm characterized by XX is proposed for the problem of XX, and the effectiveness is verified by experiment of XX" and "In the document X of the conventional study, the XX algorithm is proposed". Since new information is not included in the answer content, this is an example in which the knowledge of the user ID "1001" on this topic has not increased.

When a difference between the question time 1444 and the answer time 1446 is large, it indicates that the time required for the answer by the user is long, and therefore, the question presenting unit 11 gives an answer including more new information. If the difference between the question time 1444 and the answer time 1446 is small, it indicates that the user has given an answer that does not include new information, indicating that the time required for the answer is short. This estimation is an auxiliary estimation of the estimation based on the similarity described later with reference to FIG. 8.

Figure 6:
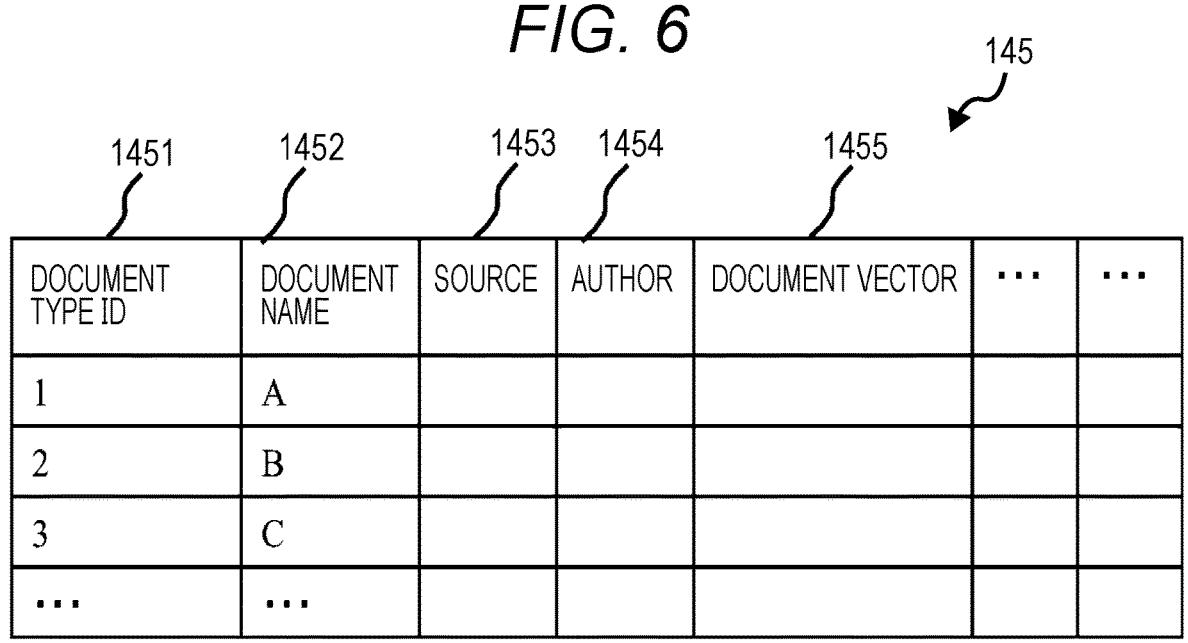
FIG. 6 is an explanatory diagram of related document data according to a second embodiment.

FIG. 6 is an explanatory diagram of the related document data 145. In the related document data 145, "document type ID" 1451, "document name" 1452, "source" 1453, "author" 1454, "document vector" 1455, and the like are managed in association with each other.

The "document type ID" 1451 stores an ID for uniquely identifying a document. For example, "1" is stored.

The "document name" 1452 stores the title of the document as a character string.

The "source" 1453 stores the source of the document as a character string.

The "author" 1454 stores the author information of the document as a character string.

A "document vector" 1455 stores vector data representing a document. For example, document words, word frequencies, word n-grams, and the like are stored.

The related document data 145 illustrated in FIG. 6 is used for comparing with the answer from the user. For example, if the answer from the user has no difference from the information described in the related document, it is determined that the answer from the user has no new information on the question, and if the difference is large, it is determined that it has new information.

Figure 7:
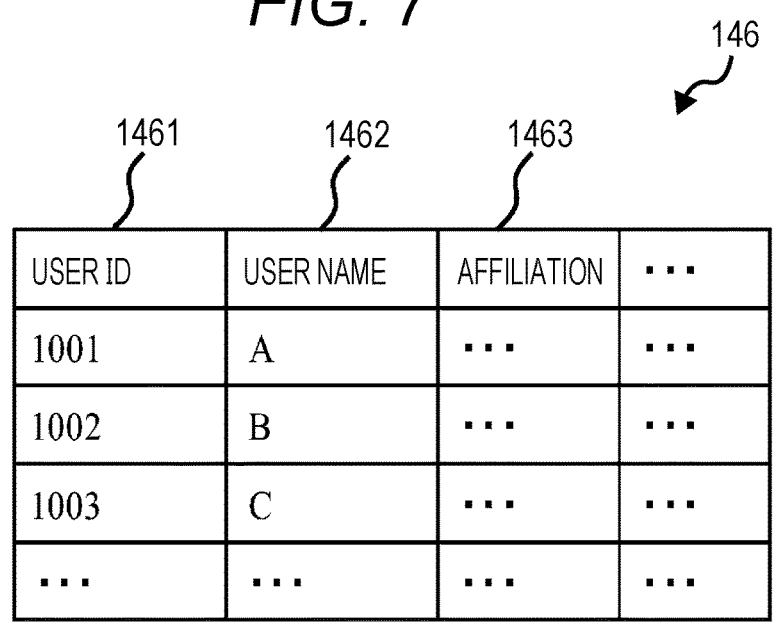
FIG. 7 is an explanatory diagram of user data according to the first embodiment.

FIG. 7 is an explanatory diagram of the user data 146. In the user data 146, "user ID" 1461, "user name" 1462, "affiliation" 1463, and the like are managed in correspondence with each other.

The "user ID" 1461 stores an ID for uniquely identifying a user.

The "user name" 1462 is stored as a character string of the user name. For example, the name of the user is stored.

In the "affiliation" 1463, the name of the organization to which the user belongs is stored as a character string. For example, a company name to which the user belongs, a department name, and the like are stored.

Further, the various IDs illustrated in FIGS. 2 to 7 are not limited to numbers but may be characters or the like as long as they can identify the respective information. For example, the "document type ID" 1411 of the document type data 141 of FIG. 2, the "document configuration ID" 1422 of the document configuration data 142 of FIG. 3, the "question ID" 1433 of the question data 143 of FIG. 4, the "user ID" 1445 of the answer history data 144 of FIG. 5, and the "document type ID" 1451 of the related document data 145 in FIG. 6 may be identification information in another format.

The information amount estimating unit 13 in FIG. 1 will be described using the above data. The information amount estimating unit 13 has a function of comparing the past answer history of the user with the current answer and estimating the degree of increase in the information amount.

Figure 8:
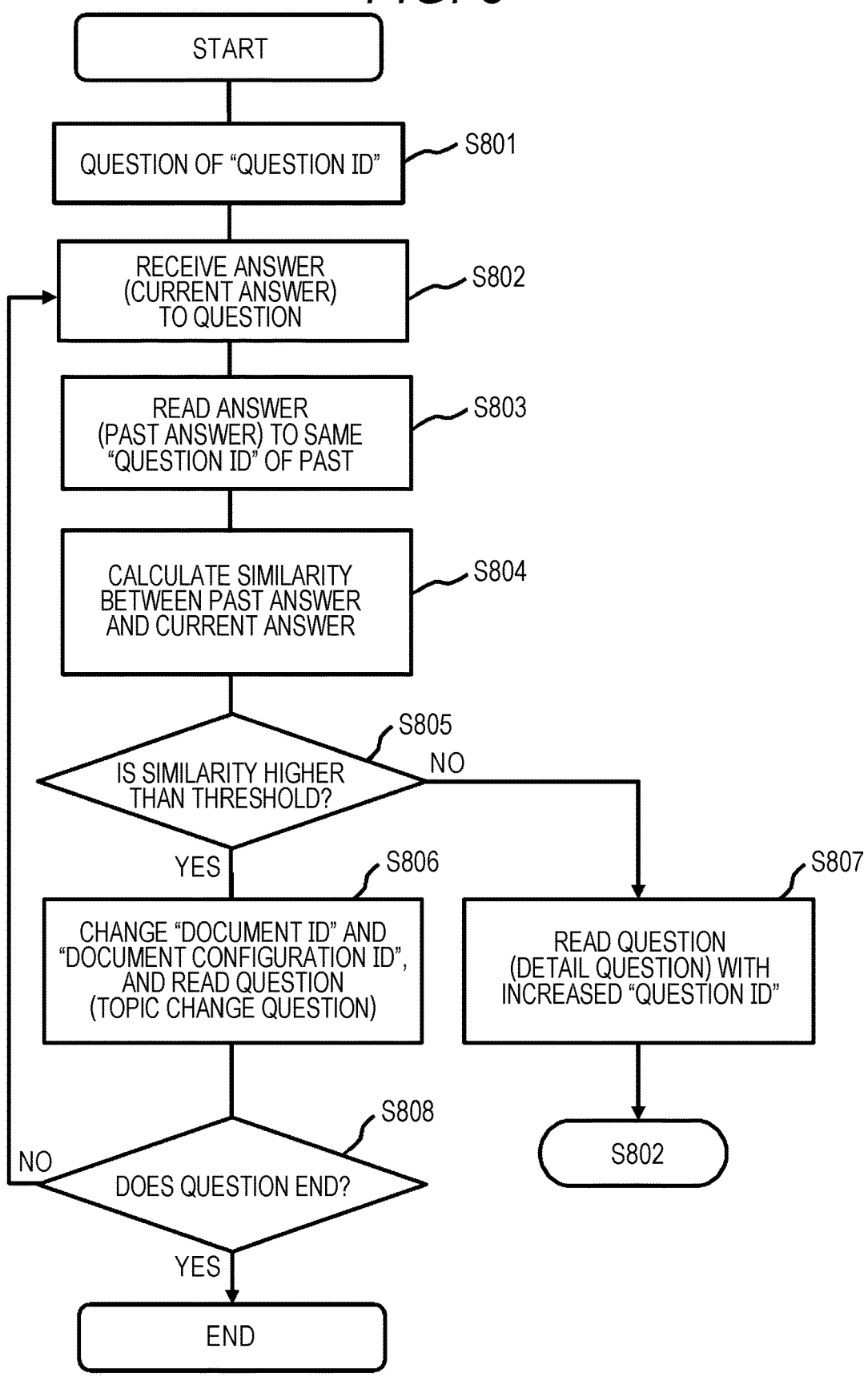
FIG. 8 is a processing flowchart of the coaching system according to the first embodiment.

FIG. 8 is a diagram illustrating a processing flow of the coaching system.

First, in Step S801, the question presenting unit 11 of the coaching system 1 asks the user a question which has the smallest "question ID" 1433 and in which the "document type ID" 1431 and the "document configuration ID" 1432 are the same value among the question data 143, and transmits the question to the document creation device 2. This question becomes a question of a broadest viewpoint in the same "document type ID" and "document configuration ID".

In Step S802, the answer receiving unit 12 receives an answer to the question (answer in this time). The received answer is accumulated in the answer history data 144 by the answer receiving unit 12 as the answer history of the question for the same document type ID and document configuration ID.

In Step S803, the information amount estimating unit 13 reads a past answer with respect to the same "document type ID", "document configuration ID", and "question ID", which is an answer to the same user from the answer history data 144 of the data management unit 14.

In Step S804, the information amount estimating unit 13 calculates the similarity between the past answer and the current answer. The calculated similarity is transmitted from the information amount estimating unit 13 to the question presenting unit 11.

In Step S805, the question presenting unit 11 compares the similarity received from the information amount estimating unit 13 with a predetermined threshold (threshold 1). That is, when the user answers, the question presenting unit 11 determines whether the information amount has increased with respect to the past answer history. This determination is made by calculating the similarity between the past answer content and the current answer content having the same "document type ID", "document configuration ID", and "question ID" of the same user. This is because the degree of increase in the information amount can be estimated from the similarity. For example, words of the past answer content and the current answer content are extracted, and the similarity is calculated in consideration of the type of word and the frequency of appearance of the word. Alternatively, the similarity is calculated including the word n-gram of the past answer content and the current answer content. Alternatively, the similarity is calculated using the type of word, the frequency of appearance of the word, and the word n-gram, including the synonyms of the words of the past answer content and the word of the present answer. This calculation result is transmitted to the question presenting unit 11.

Estimation of whether new information is included in the answer from the user based on the difference between the question time 1444 and the answer time 1446 can be used at the time of narrowing down the answer target for calculating the similarity in Step S804. For example, by calculating the similarity only when the difference between the question time 1444 and the answer time 1446 is large, the load of the calculation processing can be reduced. This is because if the difference between the question time 1444 and the answer time 1446 is small, it is unlikely that new information is included from past answers.

If the similarity between the past answer content and the current answer content is lower than a preset threshold, the question presenting unit 11 determines that the degree of increase in the information amount of the user is large, and proceeds to Step S807.

In Step S807, the question presenting unit 11 selects "detail question" because it is highly likely that information can be extracted from the user when the question is deeply explored. The selection of "detail question" selects a question ID that has not been asked yet among the same document type ID and document configuration ID. For example, the value of the current question ID is incremented by "1". When the similarity is extremely low, for example, when the similarity is lower than the predetermined threshold value 2, information can be effectively extracted from the user by increasing the increment amount to "3". The value to be incremented may be determined according to the degree of change in the similarity.

When the question presenting unit 11 selects the detail question in Step S807, the detail question is displayed on the question display unit 221 of the document creation device 2, and the answer is received in Step S802.

On the other hand, if it is determined in Step S805 that the similarity is higher than the threshold, the process proceeds to Step S806.

In Step S806, if the similarity between the past answer content and the current answer content is higher than a preset threshold, the question presenting unit 11 determines that the degree of increase in the information amount of the user is small. That is, it is determined that a possibility that information can be extracted from the user is low even if the question is deeply explored. At this time, as the next question, a question of another topic "topic change question" is selected.

There are the follow three possible choices for questions on different topics.

(1) Questions with the same "document type ID" and different "document configuration ID"
(2) Questions with different "document type IDs" and the same "document configuration IDs"
(3) Question where both "document configuration ID" and "Document type ID" are different In Step S806, when the question presenting unit 11 selects "topic change question", the content of the "topic change question" is displayed on the question display unit 221 of the document creation device 2, and an answer is received in Step S802. When there is no further "topic change question" in Step S806, the question presenting unit 11 ends the question (Step S808).

As described above, according to the first embodiment, it is possible to provide a coaching system that supports atypical intellectual work. In particular, it is possible to efficiently create documents such as academic papers and patents. As a result, the quality of the created document can be improved.

Second Embodiment

In the above description, the user's own past answer content and the current answer content have been compared, but it is also conceivable to compare with the already-existing document. For example, in the case of an academic paper, the content of the user's answer content and the written content of the academic paper can be compared in a certain document configuration, and the degree of increase in the information amount can be calculated.

The similarity calculation between the user's answer and the content of the academic paper can be performed in the same manner as the similarity calculation based on the user's own past answer and the current answer.

In this case, instead of reading the same past question ID in Step S803 in FIG. 8, the document vector of the document related to the same document type may be read from the related document data and compared with the user's answer in Step S804.

According to the second embodiment, it is possible to efficiently extract new information possessed by the user by comparing the academic paper and the knowledge of the user, thereby improving the efficiency of document creation.

What is claimed is:

1. A coaching system for supporting creation of a document, comprising:
an information input/output unit;
one or more processing units; and
one or more memory devices including:
answer history data for managing a document type ID that specifies a type of a document to be created, a document configuration ID that specifies a component of a document for each document type, a question ID that specifies a question content, and an answer content of a user in correspondence with each other; and at least one non-transitory storage medium storing at least one program that when executed by the one or more processing units configures the coaching system to perform the steps of:
selecting a question for a user, the selected question corresponding to a specific combination of values of document type ID, document configuration ID and question ID;
receiving a current answer from the user to the selected question;
storing the received current answer from the user in the one or more memory devices;
reading a past answer of the user for the selected question with respect to a same specific combination of the values of document type ID, document configuration ID, and question ID, the past answer being stored in the answer history data;

calculating a similarity value between the past answer of the user stored in the one or more memory devices and the current answer from the user, the past answer and the current answer each comprising words, and the similarity value being calculated from at least one of: (1) a word occurring in the past and current answer, a type of the word and a frequency of appearance of the word; (2) a word n-gram from the answer content of the past answer and from the answer content of the current answer; and (3) the type of the word, the frequency of appearance of the word, and the word n-gram, including the synonyms of the word of the answer content of the past answer and the word of the answer content of the current answer;

selecting a topic change question when the similarity value is greater than a predetermined value, and selecting a detail question by referencing the document type ID value and the document configuration ID value when the similarity value is less than the predetermined value; and presenting the selected topic change question or the selected detail question to the user via the information input/output unit.

2. The coaching system according to claim 1,
wherein the one or more memory devices store question data for managing the document type ID, the document configuration ID, the question ID, and question content in correspondence with each other,
wherein the question data is managed so that a plurality of the document configuration IDs correspond to one of the document type IDs, and
wherein a plurality of the question IDs and the question content are managed so as to correspond to one of the document configuration IDs.

3. The coaching system according to claim 2, wherein the one or more processing units select a question content for the detail question based on the similarity value.

4. The coaching system according to claim 2,
wherein the one or more memory devices store related document data including a document vector corresponding to the document type ID, and
wherein the one or more processing units calculate the similarity value based on the current answer from the user and the document vector.

5. The coaching system according to claim 1,
wherein the answer history data that is stored in the one or more memory devices includes a question time and an answer time, and
wherein the one or more processing units calculate the similarity value based at least in part on a difference between the question time and the answer time.

6. A coaching method for supporting creation of a document, in which a processing unit and a memory device are provided,
wherein the memory device includes;
answer history data for managing a document type ID that specifies a type of a document to be created, a document configuration ID that specifies a component of a document for each document type, a question ID that specifies a question content, and an answer content of a user in correspondence with each other, and
wherein the processing unit is configured to carry out the steps of said method, comprising:

selecting a question for a document creation user, the selected question corresponding to a specific combination of values of document type ID, document configuration ID and question ID;

receiving a current answer from the user to the selected question and storing the current answer from the user as part of the answer history data, reading a past answer of the user for the selected question with respect to a same specific combination of the values of document type ID, document configuration ID, and question ID, the past answer being stored in the answer history data, calculating a similarity value between the past answer of the user and the current answer from the user, the past answer and the current answer each comprising words, and the similarity value being calculated from at least one of: (1) a word occurring in the past and current answer, a type of the word and a frequency of appearance of the word;

(2) a word n-gram from the answer content of the past answer and from the answer content of the current answer; and (3) the type of the word, the frequency of appearance of the word, and the word n-gram, including the synonyms of the word of the answer content of the past answer and the word of the answer content of the current answer, selecting a topic change question when the similarity value is greater than a predetermined value, and selecting a detail question when the similarity value is less than the predetermined value by referencing the document type ID value and the document configuration ID value.

* * * * *